(12) United States Patent
Cherukuri et al.

(10) Patent No.: US 9,313,171 B2
(45) Date of Patent: Apr. 12, 2016

(54) PATH SELECTION IN A MULTI-SERVICE AND MULTI-TENANT SECURE CLOUD ENVIRONMENT

(71) Applicant: Cisco Technology, Inc., San Jose, CA (US)

(72) Inventors: Sunil Cherukuri, Morrisville, NC (US); Xiao Hu Gao, Chapel Hill, NC (US); Goran Saradzic, Erie, CO (US)

(73) Assignee: Cisco Technology, Inc., San Jose, CA (US)

( * ) Notice: Subject to any disclaimer, the term of this patent is extended or adjusted under 35 U.S.C. 154(b) by 221 days.

(21) Appl. No.: 14/084,378

(22) Filed: Nov. 19, 2013

(65) Prior Publication Data

US 2015/0143501 A1 May 21, 2015

(51) Int. Cl.
*H04L 29/06* (2006.01)
*H04L 12/723* (2013.01)

(52) U.S. Cl.
CPC ............ *H04L 63/02* (2013.01); *H04L 63/0227* (2013.01); *H04L 63/0272* (2013.01); *H04L 45/50* (2013.01)

(58) Field of Classification Search
CPC ....................................................... H04L 63/02
USPC .......... 726/11, 1, 12, 15, 3, 4, 5, 7, 21, 22, 24
See application file for complete search history.

(56) References Cited

U.S. PATENT DOCUMENTS

| | | | | |
|---|---|---|---|---|
| 6,578,087 B1 * | 6/2003 | Garakani | ............ | H04L 12/2602 370/238 |
| 6,614,795 B1 * | 9/2003 | Jimmei | ................... | H04L 45/10 370/401 |
| 7,068,597 B1 * | 6/2006 | Fijolek | ................ | H04L 41/0853 370/230 |
| 7,821,985 B2 * | 10/2010 | Van Megen | ......... | H04L 12/5692 370/328 |
| 8,824,340 B2 * | 9/2014 | Castro Castro | ..... | H04L 12/1407 370/259 |
| 2001/0042070 A1 * | 11/2001 | Jinzaki | .............. | G06F 17/30955 |
| 2001/0055380 A1 * | 12/2001 | Benedyk | ................ | H04M 7/125 379/219 |
| 2004/0034714 A1 * | 2/2004 | Garakani | ............ | H04L 12/2602 709/238 |
| 2006/0083261 A1 * | 4/2006 | Maeda | ................. | H04L 12/5692 370/465 |
| 2007/0211731 A1 * | 9/2007 | Balandin | ............. | H04L 12/5601 370/397 |
| 2008/0186927 A1 * | 8/2008 | Alam | ...................... | H04W 4/02 370/338 |
| 2009/0249472 A1 * | 10/2009 | Litvin | ................. | H04L 63/0263 726/14 |
| 2009/0304005 A1 * | 12/2009 | Masputra | ................ | H04L 45/00 370/395.32 |
| 2010/0189113 A1 * | 7/2010 | Csaszar | .................... | H04L 45/00 370/400 |
| 2010/0309920 A1 * | 12/2010 | Rosenberg | .......... | H04L 12/4675 370/395.53 |
| 2011/0142054 A1 * | 6/2011 | Scholl | .................... | H04L 45/02 370/395.31 |

(Continued)

*Primary Examiner* — David Garcia Cervetti (57) ABSTRACT

A device and method are provided to provide multi-exit firewall capabilities for cloud server or cloud service deployments without prior knowledge of reachability information of a client device where the client device may belong to one of several networks accessing the cloud server or cloud service. The reachability information may be derived based on flow of data to and from the client device in response to a data transfer initiation request. A firewall connection table may be updated to record routability to the client device comprising the derived reachability information. The recorded reachability information in the connection table may be used for the data transfer with the client device instead of a default route in a routing table.

18 Claims, 5 Drawing Sheets

(56) References Cited

U.S. PATENT DOCUMENTS

| | | | |
|---|---|---|---|
| 2012/0207168 A1* | 8/2012 | Kassi Lahlou | H04L 29/12358 370/392 |
| 2012/0331173 A1* | 12/2012 | Overcash | H04L 45/306 709/238 |
| 2013/0107316 A1* | 5/2013 | Kwon | H04L 45/54 358/1.15 |
| 2013/0110995 A1* | 5/2013 | Kwon | H04N 1/00204 709/221 |
| 2013/0227670 A1* | 8/2013 | Ahmad | H04L 41/5054 726/11 |
| 2014/0003359 A1* | 1/2014 | Williams | H04L 45/54 370/329 |
| 2014/0010117 A1* | 1/2014 | Lindem, III | H04L 45/04 370/255 |
| 2014/0029447 A1* | 1/2014 | Schrum, Jr. | H04L 45/66 370/252 |
| 2014/0047098 A1* | 2/2014 | Rajah | H04L 45/586 709/224 |
| 2015/0023205 A1* | 1/2015 | Vasseur | H04L 45/42 370/254 |

\* cited by examiner

PATH SELECTION IN A MULTI-SERVICE AND MULTI-TENANT SECURE CLOUD ENVIRONMENT

FIELD

The present disclosure relates to cloud services and more specifically, to cloud environments that provide multi-zone cloud services.

BACKGROUND

A cloud service provider may host multi-zone and multi-tenant cloud servers. The cloud servers may host workloads for a tenant or a client of the cloud service provider. The cloud servers may provide access to the workloads to the client via multiple entry (and/or exit) points such as the internet, Multiprotocol Label Switching (MPLS), and MPLS-Virtual Private Network (MPLS-VPN). A firewall device associated with the cloud server may provide a client device access to only those workloads that the client device is authorized to access. The firewall device may provide such access, or alternately limit access, dynamically when the firewall device does not have any reachability information about the client device.

DESCRIPTION OF EXAMPLE EMBODIMENTS

Overview

By way of introduction, the example embodiments described below include a device and method to provide multi-exit firewall capabilities for cloud server deployments.

According to a first aspect, a device may provide multi-entry and/or multi-exit capabilities for cloud deployments without prior knowledge of prefix or reachability information of a client device, and derive such information based on network interface on which data packets may be received. The firewall device may include a processor configured to determine reachability information of a client in response to a data transfer request between the client and the server, wherein an address prefix of the client is unknown. The processor may further be configured to update a connection table stored in a memory by adding the reachability information to the connection table. A route between the client and the server corresponding to the derived reachability information may be used for the data transfer instead of a default route stored in a routing table stored on the memory of the firewall device. The firewall device may further include a first network interface as part of a first default route for communication with a public network and a second network interface, which is part of a second default route for communication with a private network.

In a second aspect, a method may transfer data between a server and a client device absent reachability information of the client device by dynamically inferring the reachability information based on data flow. The method may include receiving, at a processor of a firewall device, an initial data packet that is part of a data transfer between a server and a client that is one of a plurality of clients. The method may further determine from a routing table a first network interface of the firewall device allocated to communicate with the server. In the absence of a route corresponding to the client in the routing table, the processor may use a set of default routes on a plurality of interfaces and dynamically identify a second network interface of the firewall device allocated to communicate with the client. A connection between the first network interface and the second network interface may be established and recorded, by the processor, in a connection table. All subsequent data packets of the data transfer between the client and the server may be routed via the established connection in the connection table instead of a default route from among the default routes. Alternatively, or in addition, the method may include recording the network interface on which the packet is received in the connection table. The method may further involve sending the initial data packet to the server via a route stored in the routing table and forwarding a return packet received from the server to the client, using the network interface recorded in the connection table.

In a third aspect, a non-transitory computer readable media comprising instructions executable by a processor is provided. The media may include instructions to establish a plurality of default routes comprising a first default route configured to communicate with a first network via a first network interface and a second default route configured to communicate with a second network via a second network interface. The instructions further include instructions to update a routing table to configure a third network interface to communicate with a server. The instructions also derive reachability information of a client in response to receipt of an initial data packet of a data transfer between the client and the server. The instructions further include instructions to add a derived route or connection between the client and the server in a connection table, the derived route indicating the derived client reachability information. Further instructions on the media may include instructions to transfer subsequent data to the client via the derived route instead of the default routes.

Further aspects and advantages are discussed below in conjunction with the example embodiments.

Example Embodiments

It is to be understood that the following description of examples of implementations are given only for the purpose of illustration and are not to be taken in a limiting sense. The partitioning of examples in function blocks, modules or units shown in the drawings is not to be construed as indicating that these function blocks, modules or units are necessarily implemented as physically separate units. Functional blocks, modules or units shown or described may be implemented as separate units, circuits, chips, functions, modules, or circuit elements. Alternatively, or in addition, one or more functional blocks or units may also be implemented in a common circuit, chip, circuit element or unit.

Figure 1:
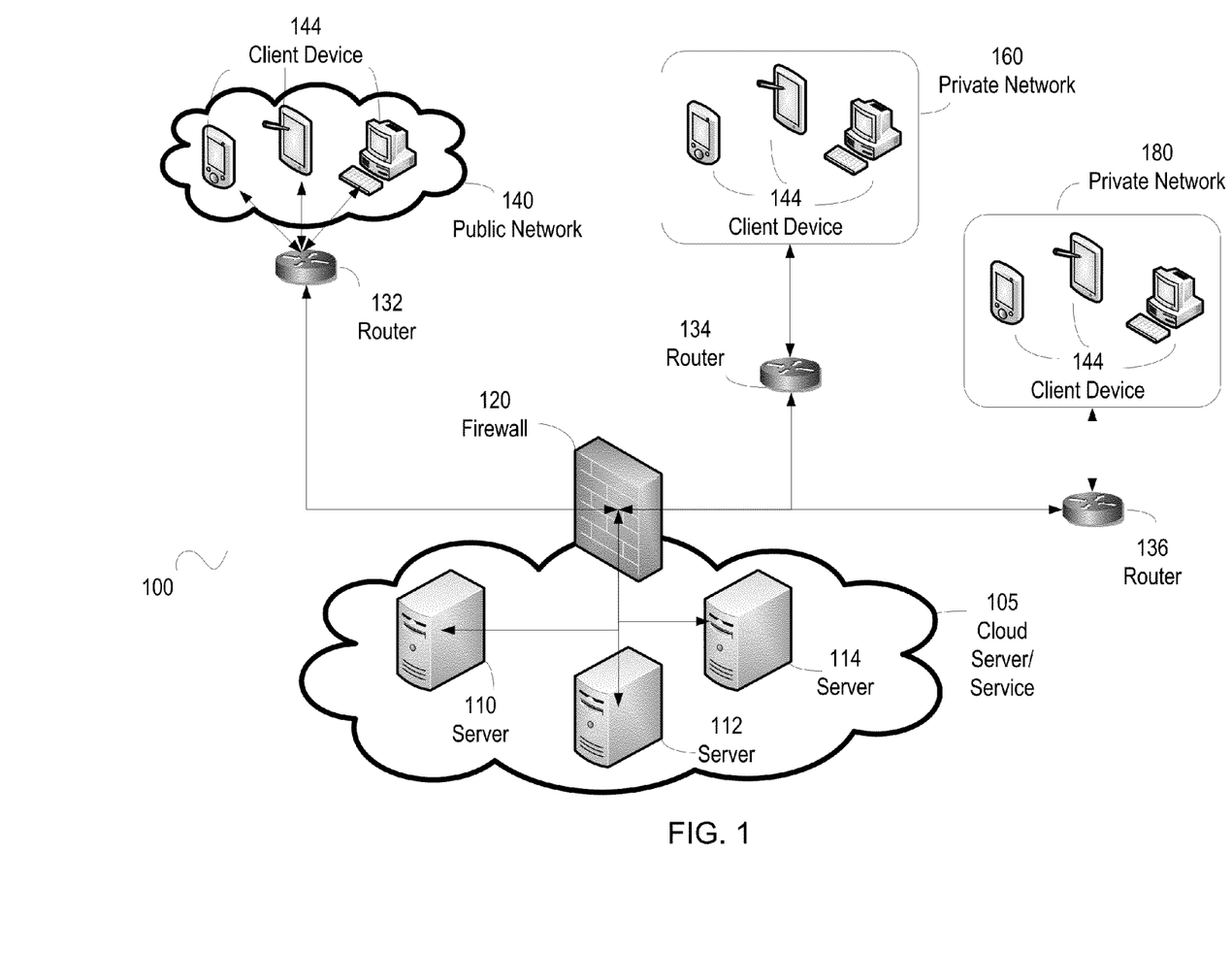
FIG. 1 is an example block diagram of a cloud environment system.

FIG. 1 is a block diagram of an example cloud environment 100 including a cloud server 105, a firewall 120, routers 132, 134, and 136, a public network 140, a first private network 160 and a second private network 180. The cloud server 105 may also be a cloud service.

Cloud computing relies on sharing of resources and virtualizing resources, to be shared by multiple users and dynamically re-allocated per demand. The cloud server or service 105 may include one or more physical or virtual servers, such as a first server 110, a second server 112, and a third server 114. The term "server" is conventionally used to refer to a computer that includes hardware on which instructions are executable. The first server 110, the second server 112 and the third server 114 may be interconnected for communication. Such interconnection may allow distribution of tasks among the servers 110-114. The servers 110-114 may be specifically built to perform in a cloud server 105 environment. Thus, the servers 110-114 may be architected such that the cloud server 105 provides high availability of data and applications being executed on the cloud server 105. For this, the servers 110-114 may execute an application cooperatively by passing messages among themselves. The servers may distribute execution of the application based on a predetermined policy such as equal load balancing or load sharing according to free resources. The servers 110-114 may access data and resources of each other. Further, the servers may either be bare-metal instances or virtual machines in a virtualized hypervisor environment.

The routers 132-136 may be network devices capable of forwarding, sending, or receiving data. The routers 132-136 may be switches. The routers 132-136 may connect with logical subnets and may operate as Layer 3 devices, Layer 2 devices or both Layer 2 and Layer 3 devices.

The client device 144 may be a desktop computer, a laptop computer, a PDA, a tablet computer, a mobile phone, a television console, a gaming console or any other such device capable of communicating via a communication medium. The communication medium may be wired or wireless. The client device 144 may communicate with the cloud server 105 via one of the routers 132-136. The client device 144 may communicate with the cloud server 105 as part of the public network 140 or as part of a private network such as the first private network 160 or the second private network 180. The client device 144 may communicate with the cloud server 105 using an IP protocol such as Hyper Text Transfer Protocol (HTTP), Secure Sockets Layer (SSL or HTTPS), File Transfer Protocol (FTP), User Datagram Protocol (UDP) or any other protocol. The communication may include data packets transferred using various techniques such as broadcast, unicast, multicast and may also use label switched paths (LSP) or multiprotocol label switched paths (MPLS). The data packets may be encrypted or un-encrypted.

The private network, such as the private network 160, may be a Local Area Network (LAN), Wide Area Network (WAN), Virtual Private Network (VPN) or any set of network enabled devices configured to be part of a group, or in a specific location. The network enabled devices in the private network may share a network address space such as an internet protocol (IP) address space or a subnet, and may be part of a network domain. The network address space may be compliant with a network communication standard, such as the specifications laid down by the Internet Engineering Task Force (IETF) standards such as RFC 1918 for IPv4, RFC 4193 for IPv6 or RFC 6598 for carrier networks. The private network may be a home network, or an office network or an enterprise network. The private network may have a network address translator (NAT) (not shown) and/or a proxy server (not shown) to connect to the Internet and to the cloud server 105. The private network, such as the private network 160 may include one or more client devices 144. The client device 144 comprising the first private network 160 may communicate with the cloud server via the router 134. The client device 144 comprising the second private network 180 may communicate with the cloud server via the router 136.

The public network 140 may be the internet or any other network that is openly reachable from the internet. The public network 140 may include one or more publicly routable IPv4 or IPv6 network address spaces. The public network 140 may include one or more than one client device 144. The client device 144 of the public network 140 may communicate with the cloud server 105 via the router 132.

Figure 2:
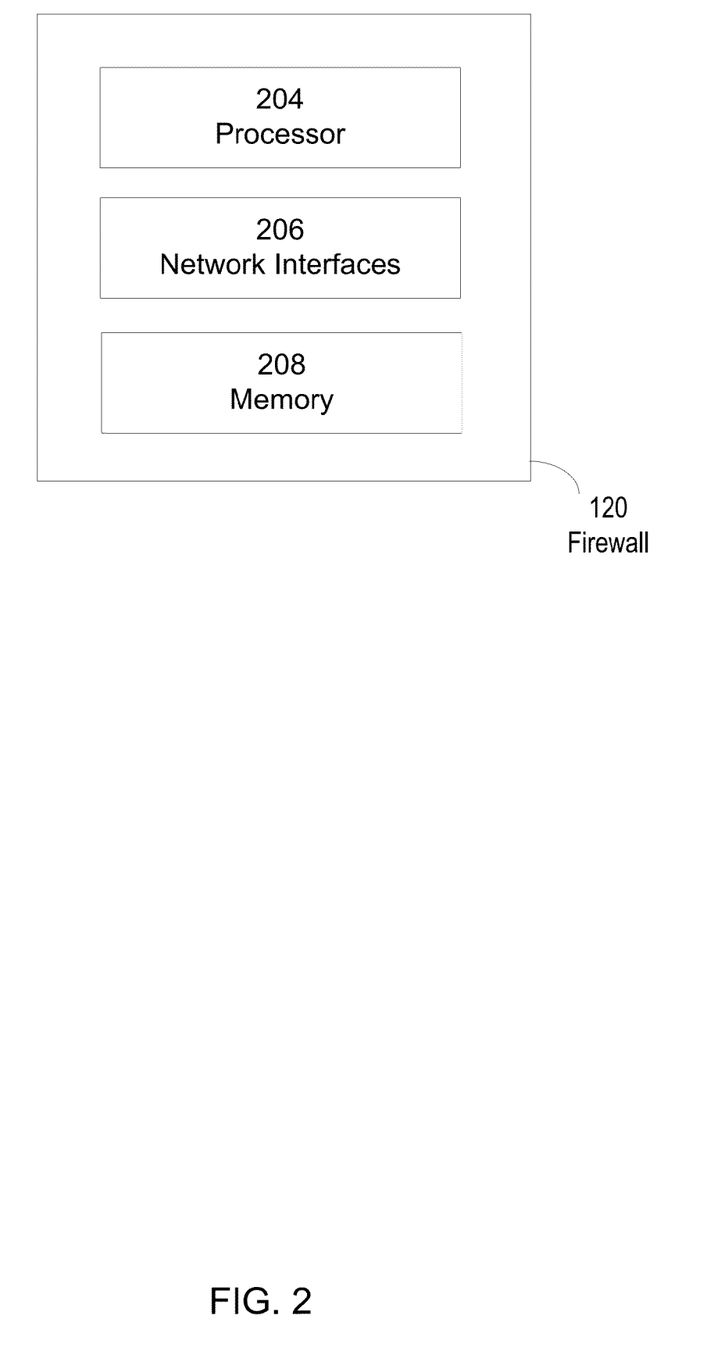
FIG. 2 is a block diagram detailing components of an example firewall device.

The firewall device 120 may be a network device that may monitor and control incoming and outgoing data from a server, such as one of the servers 110-112, comprising the cloud server 105. All the incoming and outgoing data from the server may pass through the firewall device 120. The firewall device 120 may control the data by analyzing data packets and determining whether the data packets should be allowed to pass through or not, based on a rule set. Alternatively, or in addition, the firewall device 120 may analyze the data in the data packets to ensure there is no malicious content present in the data packets before allowing the data packets to pass. The firewall device 120 may further provide network address translation for the servers in the cloud server 105. FIG. 2 provides an example firewall device 120 which includes a processor 204, one or more network interfaces 206, and memory 208.

The processor 204 may perform tasks of the firewall device 120 and control the operation of the firewall device 120. The processor 204 may be a microprocessor, a digital signal processor, a graphics processing unit, or any other processing unit capable of executing computer readable instructions.

The network interfaces 206 may enable communication between the cloud server 105 and the client device 144 from the public network 140 or the private network such as 160 or 180. A network interface of the network interfaces 206 may be capable of receiving and transmitting data over a network. The network interface may include an embedded component as part of a circuit board, a computer mother board, a router, an expansion card, a printer interface, a USB (universal serial bus) device, or as part of any other hardware. The communication may be via a wired or a wireless communication medium. The network interface may utilize any protocol of 3G/4G/EDGE/4G LTE, Bluetooth®, WiMax®, GPRS, UMTS, HSDPA, HSPA or any other protocol or any combination thereof. The network interface may be capable to switch between one communication medium and another communication medium seamlessly.

The memory 208 may be a non-transitory memory storage device and may include instructions executable by the processor 204 or the other units of the firewall device 120. The memory 208 may be volatile memory and/or non-volatile memory or a cache memory such as a random access memory (RAM), or flash memory. Alternatively or in addition, the memory 208 may include an optical, magnetic (hard-drive) or any other form of data storage device. The memory 208 may store data related to the operation of the firewall device 120. Such data may include a routing table, a connection table, and default routes associated with the network interfaces 206 among other data.

The routing table may list routes to particular network destinations such as the servers in the cloud server 105. The routing table may also list metrics associated with each route listed in the routing table. A route listed in the routing table may be a static route which may be fixed based on a topology of the cloud server 105. The route may be added or installed in the routing table manually. Alternatively or in addition, the route in the routing table may have been learned dynamically through routing protocols. The routing table may further include one or more default routes to the public network 140 or multiple private networks, such as the private networks 160 and 180. In a cloud environment, it may not be possible to know a-priori all possible networks and address prefixes of client devices that want to access the servers and services. In order to support access from client devices from multiple public and private networks without a-priori knowledge of their respective network identity and/or address prefixes, multiple default routes may be added to the routing table of the firewall device 120. The upstream routers 132, 134, 136 may be able to route to the specific client devices. The connection table may list existing connections between two network destinations that may be involved in a data transfer, such as the client device 144 and the server 110 of the cloud server 105. The connections may involve any network communications protocol such as Transmission Control Protocol (TCP), User Datagram Protocol (UDP), or any other such network communication protocol or a combination of such network communication protocols. The firewall device 120 may be a stateful firewall device in which case the connection table may keep track of a state of an existing connection inspected and forwarded by the firewall device 120. A connection recorded in the connection table may include information about the IP addresses of the network destinations and protocols and TCP/UDP ports involved in the data transfer. It may also include information about the network interfaces of the firewall device 120 being used to communicate with the network destinations. The connection table may contain one or more connection entries between a pair of network destinations, each connection corresponding to a particular data transfer.

The firewall device 120 may further be able to limit the client device 144 from accessing certain parts of the cloud server 105 based on whether the client device 144 is part of the public network 140 or a private network such as the first private network 160. The client device 144 may be identified as part of the public network 140 or the first private network 160 based on a unique identifier of the client device 144 such as the MAC address of the client device 144 or a combination of these and/or any other unique identifier. The firewall device 120 may designate the client device 144 as part of the first private network 160 based on an authentication of the client device 144, such as, for example, login credentials entered at the client device 144 or a virtual private network (VPN) credentials being used by the client device 144 to communicate with the cloud server 105.

The cloud server 105 may host workloads which may include applications and/or data. A workload may be a public workload, which may be accessible by any client device 144 irrespective of a location of the client device 144 as long as the client device 144 has network access. A workload may alternatively be a private workload, which may be accessible only by an authorized client device 144. Authorization of a client device 144 may be predetermined, and may be based on, for example, authentication of the client device 144 or the unique identifier of the client device 144. For instance, the cloud server 105 may host a document repository workload. The client device 144 may access documents in the document repository only if the client device has the authorization. Further, the cloud server 105 may restrict access to some of the documents in the document repository to the client device 144 with the correct authorization and further with the right level of privilege. The server of the cloud server 105 may store a document of the document repository which may be accessed by the client device 144. The client device 144 may open the document in an application being executed locally at the client device 144. The cloud server 105 may host several other such workloads such as internet radio, e-mail server, database, compute intensive tasks, instant messaging, video streaming service, and teleconference service.

Figure 3:
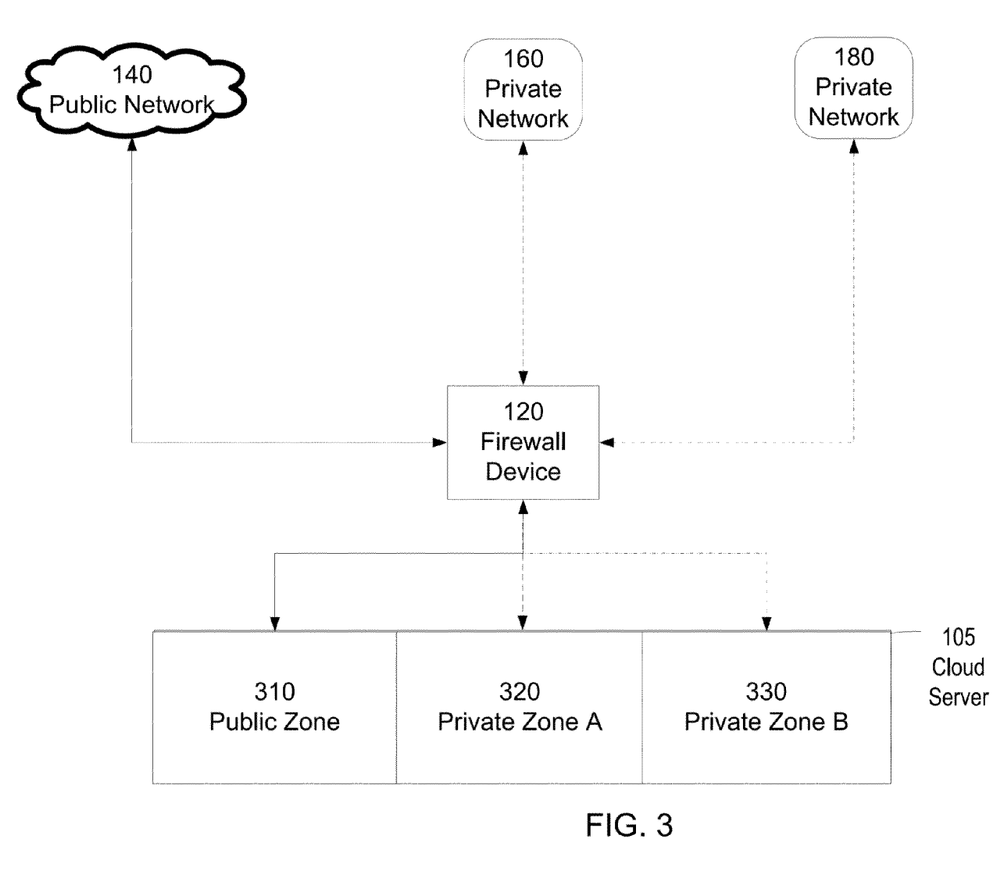
FIG. 3 is a block diagram exemplifying zones in a cloud server accessible by authorized client devices.

Further, as shown in FIG. 3, the cloud server 105 may host workloads in one or more public zones, such as public zone 310 and one or more private zones, such as first private zone 320 and second private zone 330. The private zones may be more secure than the public zones. The first private zone 320 may be reserved for private workloads from the first private network 160. The client device 144 which is identified as part of the first private network 160 may be able to access a workload from the first private zone 320. The client device 144 which is not identified as part of the first private network 160 may not be able to access the workload from the first private zone 320. The second private zone 330 may be reserved for private workloads from the second private network 180. Thus, a workload from the second private zone 330 may be accessible only by the client device 144 identified as part of the second private network 180. Any client device 144, irrespective of whether the client device 144 is part of the public network 140 or the private network may be able to access a workload from the public zone 310. Alternately, the workload from the public zone 310 may only be accessible by the client device 144 from the public network 140. Further, the client device 144 from the private network may have limited access to the workloads hosted on the cloud server 105 based on rules applicable to the private network. Such rules may be applied to the client device 144 in response to network policies setup by a network administrator of the private network to which the client device 144 belongs. The cloud server 105 including both public and private zones may be referred to as a hybrid cloud server. The cloud server 105 hosting workloads only in the private zone may be referred to as a private cloud server and the cloud server 105 hosting only the public zone may be referred to as a public cloud server.

The cloud server 105 may receive commands and data from the client device 144. The cloud server 105 may also send commands and data to the client device 144. A data transfer between the cloud server 105 and the client device 144 may be initiated by either the cloud server 105 or the client device 144. The data transfer initiated by the client device 144 may be referred to as an outside-to-inside connection. While the data transfer initiated by the cloud server 105 may be termed as an inside-to-outside connection. The data transfer may be directed towards a particular server (or group of servers) in the cloud server 105. The data transfer between the particular server of the cloud server 105 and the client device 144 may pass through the firewall device 120.

The firewall device 120 may have one or more default or specific routes to communicate with the particular server in the cloud server or service 105. The firewall device 120 may also have multiple default routes including a default route to each private network and a default route to each public network that has workloads hosted with the cloud server/service 105. Each default route may indicate a network interface of the firewall device 120 through which a destination public or private network may be reached. The client device 144 may be one or more network hops away from the firewall device 120. A route or a communication path from the network interface of the firewall device 120 to the client device 144 may include multiple routers and switches. In a cloud environment, it is not possible to know a-priori all the possible networks and prefixes that want to access the cloud server 105. The firewall device 120 may not have dynamic routing information indicating the route to transfer data to and from the client device 144. Thus, reachability information for the client device 144 may not be known to the firewall device 120.

In order to support access from multiple public and private networks without knowing the client networks and/or prefixes a-priori, the multiple default routes may be stored on the firewall device 120. The firewall device 120 may dynamically determine the route to the client device 144 in response to a request to initiate the data transfer between the cloud server 105 and the client device 144. The request to initiate data transfer may be in form of an initial data packet or any other message.

Figure 4:
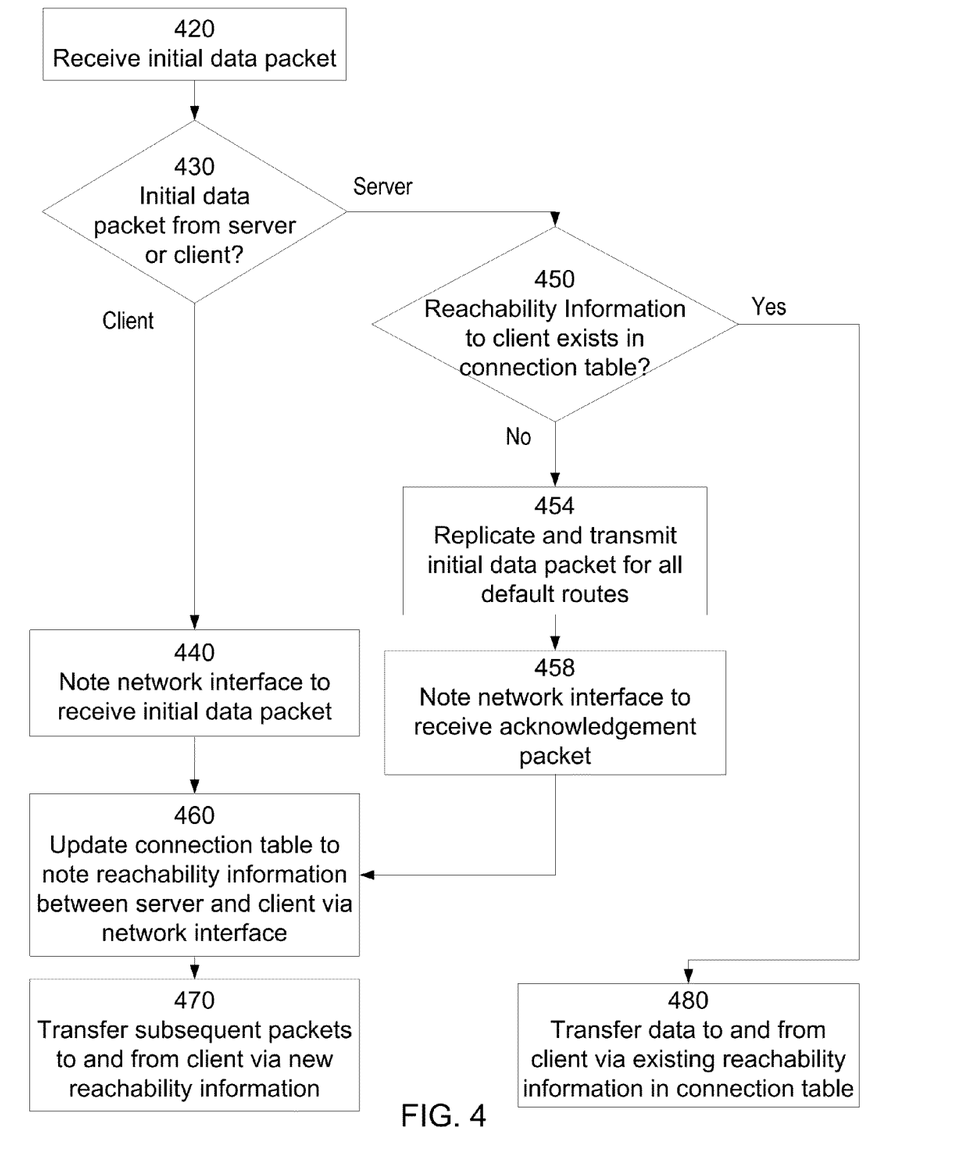
FIG. 4 is a flow diagram of operation of an example firewall device.

The firewall device 120 may determine the route to the client device 144 dynamically, despite the multiple default routes, as exemplified in FIG. 4. In one example, the firewall device 120 may store two or more default routes in the routing table. A first default route may assign a first network interface of the firewall device 120 for the data transfer involving the client device 144 of the first private network 160. The firewall device may further assign a second network interface of the firewall device 120 for the data transfer involving the client device 144 of the public network as part of a second default route. As indicated earlier, in the first default route and in the second default route, a third network interface may be assigned for data transfers involving the server of the cloud server 105. In step 420 the firewall device 120 may receive a connection initiation request for the data transfer. In step 430 the firewall device may determine whether the initiation request came from the client device 144 or the server of the cloud server 105. In case the initiation request was received from the client device 144, the firewall device 120 at step 440 may note a network interface on which the initiation request was received. The firewall device 120 may record the reachability information to the client device 144 in the connection table in step 460. The reachability information may include the network interface for reachability of the client device 144 and also the network interface for reachability of the server of the cloud server 105. The reachability information of the client device 144 may be an IP address or prefix of the client device 144 in a subnet or other such information that would enable transferring data to and from the client device 144. The reachability information may be added into the connection table. The reachability information may include source and destination IP addresses and ports used for the connection. The reachability information may be referred to as a pseudo-route or the reachability information may indicate a pseudo-route. As per step 470, subsequent data packets and messages of the data transfer involving the client device 144 and the server may be transferred using the recorded reachability information in the connection table, instead of the first default route or the second default route. During the subsequent data transfer between the client device 144 and the server, the routing table and the connection table may be looked up and the recorded reachability information from the connection table may be used for the data transfer. In another example of the system, the reachability information for the client device 144 may be recorded directly into the routing table. In yet another example, the reachability information may be stored in the connection table and later transferred into the routing table after passage of a predetermined time or after a predetermined number of data transfers via that reachability information or any other such threshold condition.

Figure 5A:
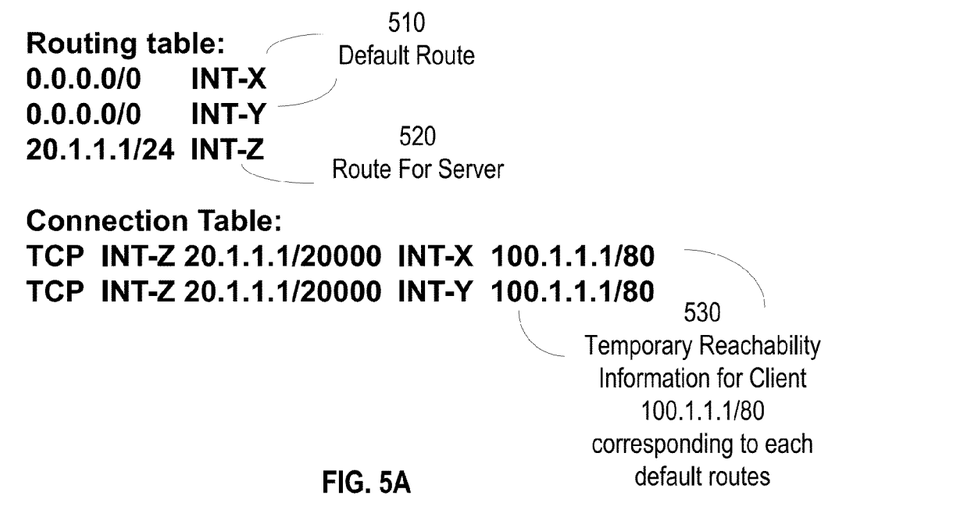
FIG. 5A and FIG. 5B are examples of states of a routing table and a connection table during an operation of an example firewall device.
Figure 5B:
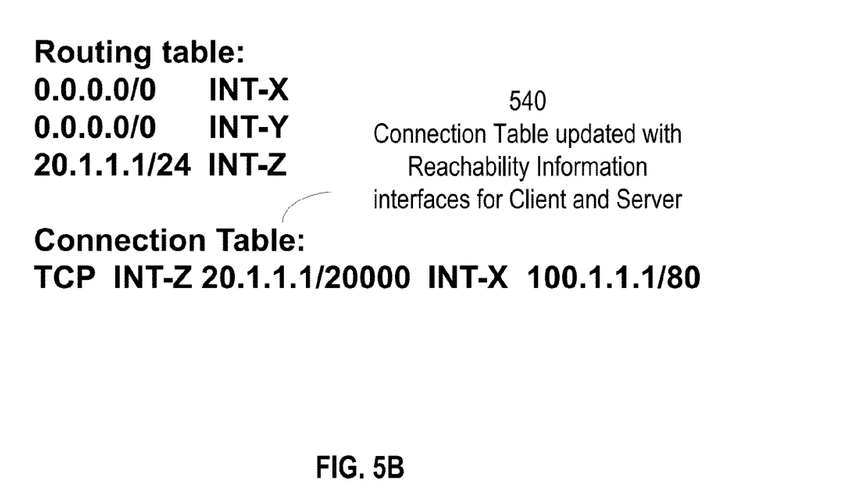

In case the initial data packet was received from the server of the cloud server 105, the firewall device 120, in step 450, may determine whether the connection table contains the reachability information for the client device 144. In case the connection table contains the reachability information to the client device 144, a route indicated by the reachability information may be used in step 480 for the data transfer. If the connection table does not contain the reachability information, the routing table may be accessed for the reachability information. FIGS. 5A and 5B illustrate the routing table and the connection table in such an example system. The routing table may indicate the default routes 510 comprising the first default route and the second default route. The routing table may also contain the reachability information 520 for the server of the cloud server 105 from which the initial data packet was received. In step 454, the firewall device may replicate and forward the initial data packet for each default route or path that may lead to the client device 144. Thus, the firewall device 120 may not replicate and forward the initial data packet to all the network interfaces 206. Rather, the firewall device 120 may identify that the third network interface is assigned to the server and therefore, not forward the initial data packet to the server. Instead, the firewall device 120 may replicate and forward the initial data packet on those network interfaces that have default routes associated that may lead to the client device 144. The firewall device 120 may not attempt to load balance the data transfer between the default routes by per flow load sharing, and/or picking only one default route. Instead, in step 454, the initial data packet may be transferred via the first network interface along the first default route and the replicated initial data packet may be transferred via the second network interface along the second default route. Additionally, the firewall device 120, may record temporary reachability information 530 in the connection table corresponding to the network interfaces on which a replica of the initial data packet is forwarded. Thus, in this exemplary operation, the firewall device 120 may store a first temporary reachability information corresponding to the first network interface, and a second temporary reachability information corresponding to the second network interface. The firewall device 120 may monitor the first network interface and the second network interface for receipt of acknowledgement from the client device 144. The acknowledgment may be received in form of an acknowledgment packet or any other indication from the recipient of the initial data packet. Since the upstream routers 132-136 may drop a data packet directed to the client device 144 if the route to the client device 144 is unknown, only the routers 132-136 with routing information of the client device 144 succeed in transmitting the replica of the initial data packet to the client device 144 and returning the acknowledgement from the client device 144. Therefore, only one of the first network interface and the second network interface may receive the acknowledgement from the client device 144. Additional security mechanisms such as authentication and secure protocols like HTTPS may further ensure that the data transfer occurs between the server and the right client device 144.

The firewall device 120, in step 458, may note the network interface on which the acknowledgement is received from client device 144. The connection table may be updated, and an updated connection table 540 may contain the reachability information indicating the reachability of the client device 144 i.e. the network interface on which the acknowledgement is received. The temporary routes which were added to the connection table 540 and on which acknowledgement is not received may be now removed. Thus, the updated connection table 540 may only contain information from the first temporary reachability information for client 144, and the second temporary reachability information may be removed from the updated connection table 540. Alternatively, instead of adding the temporary reachability information 530 and removing some of them, the firewall device 120 may update the connection table only after step 458, in response to noting the network interface on which the acknowledgement is received and establishing the reachability information between the server and the client device 144. Thus, only the connection with the correct reachability information for the client device 144 is added to the updated connection table 540. The route in the updated connection table 540 may be used in steps 470 and 480 for data transfers to and from the client device 144 instead of one of the default routes 510. The subsequent data packets in the data transfer may be transmitted along the recorded reachability information or pseudo-route in the connection table without need for further packet replication. Further, the default routes in the routing table continue to exist for future reference and for future connection establishment. Thus, the firewall device 120 may dynamically derive the reachability information of the client device 144 which may be part of the first private network 160, the second private network 180 or the public network 140 without any prior knowledge about the reachability information or network path of the client device 144.

The firewall device 120 may remove an entry in the connection table after a predetermined interval of time is elapsed after the connection has been completed. The reachability information for the client device 144 may be stored in the connection table 540 as long as the connection to the client device 144 is being used for the data transfer. Once the data transfer is completed, the connection and the recorded reachability information for client device 144 may be deleted after a timeout period. In another example, the entry may be removed after the predetermined interval of time is elapsed since the entry was last used to determine the route to the client device 144. Further, the entire connection table may be purged upon request or according to a scheduled clean up.

The firewall device 120 may have a backup firewall device having similar capabilities to the firewall device 120. The firewall device 120, using the processor 204, may duplicate information such as the connection table and the routing table onto the backup firewall device, with both devices acting as a High Availability pair. Such duplication may allow the backup firewall device to efficiently take over operations from the firewall device 120 in case the firewall device 120 has to be taken down, in a planned or unplanned manner.

The firewall device 120 may dynamically scale up or down as infrastructure of the cloud server 105 may be modified, additional cloud services/servers are added or as tenant networks, such as the first private network 160 and the second private network 180 are added. The firewall device 120 may not have to store or provide static prefixes for each tenant network hosting workloads on the cloud server 105. Also, the firewall device 120 may not have to dynamically learn multiple prefixes for each tenant network. The firewall device 120, as described, may dynamically infer the reachability information of the client device 144 in response to the initial data transfer request from either the client device 144 or the cloud server 105. This may simplify management of the firewall 120 and the cloud server 105 by eliminating addition and removal of specific reachability information for the tenant networks hosting workloads on the cloud server 105, and instead relying on default routes and this dynamic reachability information inference mechanism.

Various embodiments described herein can be used alone or in combination with one another. The foregoing detailed description has described only a few of the many possible implementations of the present disclosure. For this reason, this description of example embodiments is intended by way of illustration, and not by way of limitation.

We claim:

1. A device comprising:
a first network interface;
a second network interface;
a memory configured to store a connection table and a routing table, the routing table comprising a first default route to a public network via the first network interface and a second default route to a private network via the second network interface;
a processor configured to:
determine a reachability information of a client in response to a data transfer request between the client and a server, wherein an address prefix of the client is unknown;
store the reachability information in the connection table, wherein the reachability information is used for data transfer between the client and the server instead of the first default route or the second default route;
replicate the data transfer request and forward the replicated data transfer request via the first default route and the second default route; and
establish the reachability information of the client via the first network interface in response to receipt of an acknowledgement from the client on the first network interface.

2. The device of claim 1, further comprising:
a third network interface configured to communicate with the server;
the third network interface further configured to receive the data transfer request from the server to transfer data between the server and the client.

3. The device of claim 2, wherein, the processor is further configured to establish the reachability information of the client via the second network interface in response to receipt of the data transfer request from the client on the second network interface to transfer data to and from the server.

4. The device of claim 3, wherein the reachability information comprises the second network interface and the third network interface.

5. The device of claim 2, wherein the reachability information comprises the first network interface and the third network interface.

6. The device of claim 1, wherein the reachability information indicates whether the client is part of the public network or the private network.

7. The device of claim 1, wherein the processor is further configured to remove the reachability information of the client from the connection table in response to inactivity over a corresponding connection between the client and the server for a predetermined amount of time.

8. The device of claim 1, wherein the processor is further configured to remove the reachability information of the client from the connection table after a predefined time interval.

9. The device of claim 1, wherein the processor is further configured to duplicate the connection table to a backup firewall device.

10. A method comprising:
receiving, by a processor, an initial data packet that is part of a data transfer between a server and a client;
determining, by the processor, via a routing table, a first network interface allocated to communicate with the server;
determining, by the processor, from the routing table, a set of default routes in absence of a route corresponding to the client;
identifying, by the processor, a second network interface allocated to communicate with the client, in response to receipt of the initial data packet from the client via the second network interface, the identifying further comprising, by the processor:

replicating the initial data packet for each default route from the set of default routes;
forwarding replicas of the initial data packet on a network interface corresponding to each respective default route; and
receiving an acknowledgement packet from the client on the second network interface;
establishing, by the processor, a connection between the server and the client via the first network interface and the second network interface;
recording, by the processor, the established connection in a connection table stored in a memory, the established connection comprising the first and second network interfaces; and
routing, by the processor, subsequent data packets of the data transfer between the client and the server via the established connection stored in the connection table instead of a default route from among the set of default routes.

11. The method of claim 10, wherein the step of identifying the second network interface in response to the initial data packet being received from the server further comprises:
recording, by the processor, in the connection table, a temporary connection for the client corresponding to each respective default route along which a replica of the initial data packet is forwarded; and
removing, by the processor, from the connection table, the temporary connection that does not correspond to the second network interface.

12. The method of claim 10, further comprising:
limiting, by the processor, the data transfer between the server and the client to a public zone of the server based on the second network interface being configured to communicate with clients in a public network.

13. The method of claim 12, wherein the client is a first client, the initial data packet is a first initial data packet, the connection is a first connection, and the data transfer is a first data transfer, the method further comprising:
receiving, by the processor, a second initial data packet as part of a second data transfer between the server and a second client;
identifying, by the processor, a third network interface configured to communicate with the second client, in response to receipt of the second initial data packet;
establishing, by the processor, a second connection between the first network interface and the third network interface;
updating, by the processor, the connection table, by recording the second connection in the connection table; and
routing, by the processor, subsequent data packets of the second data transfer between the second client and the server via the second connection in the connection table instead of the default route, wherein the second data transfer between the second client and the server accesses the public zone of the server and a private zone of the server based on the third network interface being configured to communicate with clients in a private network.

14. The method of claim 10, further comprising, removing, by the processor, the established connection from the connection table after a predetermined time interval of inactivity.

15. A non-transitory computer readable media comprising instructions executable by a processor, the non-transitory computer readable media comprising:
instructions to establish a plurality of default routes comprising a first default route configured to communicate with a first network via a first network interface and a second default route configured to communicate with a second network via a second network interface;
instructions to update a routing table to configure a third network interface to communicate with a server;
instructions to derive reachability information of a client in response to receipt from the server of an initial data packet of a data transfer between the client and the server, wherein the reachability information indicates whether the client is associated with the first network or the second network, wherein the instructions to derive include instructions to:
duplicate the initial data packet to generate a replicated initial data packet;
transfer the initial data packet via the first network interface and transfer the replicated initial data packet via the second network interface; and
derive the reachability information of the client to include the first network interface based on receipt of an acknowledgment data packet from the client via the first network interface;
instructions to add the derived reachability information between the client and the server in a connection table; and
instructions to transfer subsequent packets of the data transfer via the derived reachability information in the connection table instead of the default routes.

16. The non-transitory computer readable media of claim 15, wherein the reachability information of the client is derived to include the first network interface based on the initial data packet being received from the client via the first network interface.

17. The non-transitory computer readable media of claim 15, further comprising instructions to remove the derived reachability information from the connection table after a predetermined amount of time absent use of the reachability information.

18. The non-transitory computer readable media of claim 15, further comprising instructions to limit access of a first client from the first network to a first zone of the server and instructions to limit access of a second client from the second network to a second zone of the server.

* * * * *